US012586221B2

(12) United States Patent
Jung et al.

(10) Patent No.: US 12,586,221 B2
(45) Date of Patent: Mar. 24, 2026

(54) METHOD AND APPARATUS FOR ESTIMATING DEPTH INFORMATION OF IMAGES

(71) Applicants: Electronics and Telecommunications Research Institute, Daejeon (KR); The Trustees of Indiana University, Bloomington, IN (US)

(72) Inventors: Soon-Heung Jung, Daejeon (KR); David Crandall, Bloomington, IN (US); Vibhas Kumar Vats, Bloomington, IN (US); Shaurya Shubham, Bloomington, IN (US); Md Alimoor Reza, Bloomington, IN (US); Chuhua Wang, Bloomington, IN (US)

(73) Assignees: Electronics and Telecommunications Research Institute, Daejeon (KR); The Trustees of Indiana University, Indianapolis, IN (US)

( * ) Notice: Subject to any disclaimer, the term of this patent is extended or adjusted under 35 U.S.C. 154(b) by 304 days.

(21) Appl. No.: 18/297,396

(22) Filed: Apr. 7, 2023

(65) Prior Publication Data

US 2023/0326051 A1 Oct. 12, 2023

(30) Foreign Application Priority Data

Apr. 7, 2022 (KR) ........................ 10-2022-0043542

(51) Int. Cl.
*G06T 7/50* (2017.01)
*G06V 10/74* (2022.01)

(52) U.S. Cl.
CPC .............. *G06T 7/50* (2017.01); *G06V 10/761* (2022.01); *G06T 2207/20081* (2013.01)

(58) Field of Classification Search
None
See application file for complete search history.

(56) References Cited

U.S. PATENT DOCUMENTS 10,091,485 B2 10/2018 Lim
10,929,994 B2 2/2021 Yu et al.
(Continued)

FOREIGN PATENT DOCUMENTS

KR 101784620 B1 11/2017
KR 102110690 B1 5/2020
KR 1020210073435 A 6/2021

OTHER PUBLICATIONS

Tian et al., "Semi-supervised Depth Estimation from a Single Image Based on Confidence Learning," ICASSP 2019—2019 IEEE International Conference on Acoustics, Speech and Signal Processing (ICASSP), Brighton, UK, 2019, pp. 8573-8577, doi: 10.1109/ICASSP.2019.8683235 (Year: 2019).*
(Continued)

*Primary Examiner* — Michelle M Koeth
(74) *Attorney, Agent, or Firm* — WILLIAM PARK AND ASSOCIATES LTD.

(57) ABSTRACT

A method and apparatus for estimating depth information of an image are disclosed. The depth information estimation method of the image includes providing a confidence map for a ground truth depth map; and learning a depth information estimation model for estimating depth information of an image based on the ground truth depth map and the confidence map.

11 Claims, 8 Drawing Sheets

(56) References Cited

U.S. PATENT DOCUMENTS

| | | | | |
|---|---|---|---|---|
| 11,164,326 B2 * | 11/2021 | Liu | ........................... | G06N 3/08 |
| 12,100,173 B2 * | 9/2024 | Bhutani | ............... | H04N 13/239 |
| 2020/0193630 A1 * | 6/2020 | Mousavian | ............ | G06N 3/084 |
| 2020/0327686 A1 * | 10/2020 | Zatzarinni | ................. | G06T 5/50 |

OTHER PUBLICATIONS

Yang et al., "Fast Depth Prediction and Obstacle Avoidance on a Monocular Drone Using Probabilistic Convolutional Neural Network," in IEEE Transactions on Intelligent Transportation Systems, vol. 22, No. 1, pp. 156-167, Jan. 2021, doi: 10.1109/TITS.2019. 2955598 (Year: 2021).*
Alex Kendall et al., What Uncertainties Do We Need in Bayesian Deep Learning for Computer Vision?, 31st Conference on Neural Information Processing Systems (NIPS 2017), Long Beach, CA, USA.
Hyesong Choi et al., Adaptive confidence thresholding for monocular depth estimation, ICCV 2021, Computer Vision Foundation, pp. 12808-12818.
Inwook Shim et al., High-Fidelity Depth Upsampling Using the Self-Learning Framework, Sensors 2019, 81. https://doi.org/10.3390/s19010081, Dec. 27, 2018.
Yufan Zhu et al., Robust Depth Completion with Uncertainty-Driven Loss Functions, Computer Vision and Pattern Recognition, arXiv:2112.07895v2 [cs.CV], Dec. 28, 2021.

* cited by examiner

600

METHOD AND APPARATUS FOR ESTIMATING DEPTH INFORMATION OF IMAGES

CROSS-REFERENCE TO RELATED APPLICATIONS

This application claims the benefit of earlier filing date and right of priority to Korean Application No. 10-2022-0043542, filed on Apr. 7, 2022, the contents of which are all hereby incorporated by reference herein in their entirety.

TECHNICAL FIELD

The present disclosure relates to a method and apparatus for estimating depth information of an image, and more particularly, to a method and apparatus for estimating depth information of an image by reflecting a confidence map for a ground truth depth map.

BACKGROUND

The technology of restoring 3D images based on images is one of the topics that have been studied for a long time in the field of computer vision. Recently, research using machine learning technology has been actively conducted, and it shows excellent performance in terms of performance and complexity.

For 3D image reconstruction, a technique for estimating depth information is required. Research into a method of estimating depth information by applying machine learning technology to a case where an input image is a single image or a plurality of images including stereo images is being actively conducted. A supervised learning method is widely used in machine learning-based depth estimation, and for this, a 2D image and a corresponding ground truth depth map are required.

However, when measuring actual depth information through Lidar or the like, it is difficult to collect all depth information corresponding to a 2D image. Accordingly, depth information is generated for pixels for which depth information is not collected by using a depth completion technology, and the generated depth information is sometimes used as a ground truth depth map.

SUMMARY

A technical problem of the present disclosure is to provide a method and apparatus for estimating depth information of an image by reflecting a confidence map for a ground truth depth map.

The technical problems to be achieved in the present disclosure are not limited to the technical tasks mentioned above, and other technical problems not mentioned will be clearly understood by those skilled in the art from the description below.

According to an embodiment of the present disclosure, a method and apparatus for estimating depth information of an image are disclosed. The method of estimating the depth information of an image includes providing a confidence map for a ground truth depth map; and learning a depth information estimation model that estimates depth information of an image based on the ground truth depth map and the confidence map.

Here, the providing the confidence map may include generating a confidence map for the ground truth depth map, and providing the generated confidence map.

Here, the providing the confidence map may include generating the confidence map using a pre-learned confidence estimation model that inputs at least one image corresponding to the ground truth depth map and the ground truth depth map.

Here, the providing the confidence map may include filling a empty depth value of the ground truth depth map using a depth completion technology and providing the generated confidence map by generating a confidence map for the ground truth depth map filled with the empty depth value.

Here, the providing the confidence map may include for a ground truth depth map with a predetermined ratio of the empty depth value among the ground truth depth map, filling the empty depth value using the depth completion technology.

Here, the providing the confidence map may include configuring the confidence value to 1 for a depth value generated in same pixel position as the ground truth depth map; and generating a confidence map for the ground truth depth map filled with the empty depth value, by configuring the confidence value based on distance from a number of pixels having a confidence value present in a certain radius for a depth value of a remaining pixel position.

Here, the learning the depth information estimation model may include learning the depth information estimation model by reflecting the confidence map in a loss function.

The method for estimating depth information of image includes obtaining a ground truth depth map includes filling an empty depth value for each of the obtained ground depth map using a depth completion technique; generating a confidence map for the ground depth map filled with the empty depth value; and learning a depth information estimation model for estimating depth information of an image based on the ground truth depth map filled with the empty depth value and the confidence map.

The apparatus for estimating depth information of an image includes a provision unit to provide a confidence map for a ground truth depth map; and a learning unit to learn a depth information estimation model for estimating depth information of an image based on the ground truth depth map and the confidence map.

Furthermore, the apparatus for estimating depth information of the image further may include an acquisition unit for obtaining the ground truth depth map and providing the ground truth depth map to the provision unit.

The features briefly summarized above with respect to the present disclosure are only exemplary aspects of the detailed description of the present disclosure that follows, and do not limit the scope of the disclosure.

According to the present disclosure, a method and apparatus for estimating depth information of an image by reflecting a confidence map for a ground truth depth map may be provided.

The effects obtainable in the present disclosure are not limited to the effects mentioned above, and other effects not mentioned will be clearly understood by those skilled in the art from the description below.

DETAILED DESCRIPTION

Figure 1:
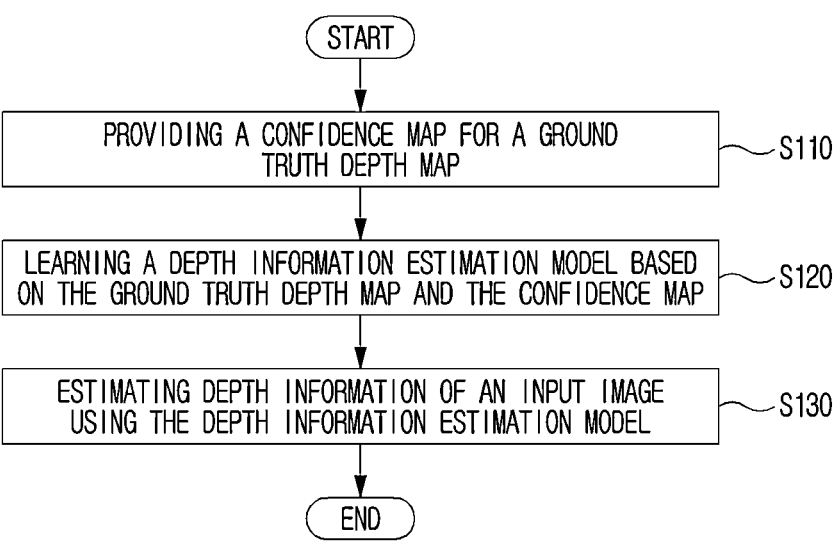
FIG. 1 is a flowchart illustrating a method for estimating depth information of an image according to an embodiment of the present disclosure.

Hereinafter, embodiments of the present disclosure will be described in detail with reference to the accompanying drawings so that those of ordinary skill in the art to which the present disclosure pertains can easily implement them. However, the present disclosure may be embodied in several different forms and is not limited to the embodiments described herein.

In describing an embodiment of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when an element is referred to as being "connected", "combined" or "linked" to another element, it may include an indirect connection relation that yet another element presents therebetween as well as a direct connection relation. Also, when it is said that a component includes "includes" or "has" another component, it means that another component may be further included without excluding other components unless otherwise stated.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

In the present disclosure, the components that are distinguished from each other are for clearly explaining each characteristic, and do not necessarily mean that the components are separated. That is, a plurality of components may be integrated to form one hardware or software unit, or one component may be distributed to form a plurality of hardware or software units. Therefore, even if not separately mentioned, such integrated or distributed embodiments are also included in the scope of the present disclosure.

In the present disclosure, components described in various embodiments do not necessarily mean essential components, and some may be optional components. Accordingly, an embodiment composed of a subset of components described in an embodiment is also included in the scope of the present disclosure. In addition, embodiments including other components in addition to components described in various embodiments are also included in the scope of the present disclosure.

In the present disclosure, expressions of positional relationships used herein, such as upper, lower, left, right, etc., are described for convenience of explanation. When viewing the drawings shown in this specification in reverse, the positional relationship described in the specification may be interpreted in the opposite way.

The gist of embodiments of the present disclosure is to improve depth information estimation performance of an image by using an image for learning machine learning-based depth information estimation network and corresponding ground truth depth map and a confidence map corresponding to ground truth depth map.

That is, the embodiments of the present disclosure may more accurately estimate depth information of an input image, by training a depth information estimation network or depth information estimation model for estimating the depth information of an image, and by reflecting the confidence value of each pixel of the ground truth depth map as well as the ground truth depth map to the loss function.

FIG. 1 is a flowchart illustrating a method for estimating depth information of an image according to an embodiment of the present disclosure.

Referring to FIG. 1, a method for estimating depth information of an image according to an embodiment of the present disclosure includes providing a ground truth map and a confidence map for the ground truth depth map (S110), learning a depth information estimation model (or depth information estimation network) for estimating depth information of an image based on a ground truth depth map and a confidence map for the ground truth depth map (S120), and estimating depth information of an input image for which depth information is to be estimated using the learned depth information estimation model (S130).

Step S110 is a process of providing a confidence value for each pixel of the ground truth depth map, and provides a confidence value for each pixel of the ground truth depth map.

Here, in step S110, when providing the ground truth depth map, the provided ground truth depth map may be provided, or by generating a confidence map corresponding to the ground truth depth map using the ground truth depth map and at least one image corresponding to the ground truth depth map, the generated confidence map may be provided.

According to the embodiment, in step S110, a confidence map may be obtained using a ground truth stereo image used to generate a ground truth depth map, and for each of the pixels, a pixel value difference for each pixel in the stereo image may be calculated, and after calculating the similarity of each pixel of the stereo image based on the pixel value difference between the pixels calculated as described above, a confidence map for the ground truth depth map may be generated using the calculated similarity.

Figure 3:
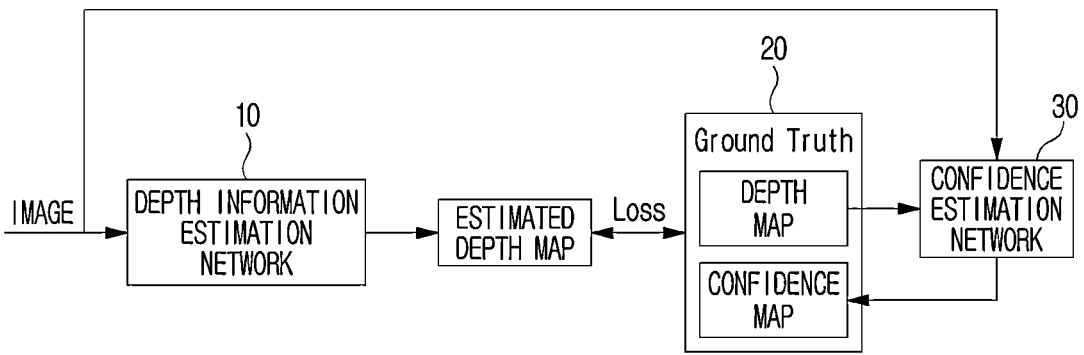
FIG. 3 is a diagram illustrating a learning structure of another embodiment of a depth information estimation network.

According to another embodiment, step S110, as shown in FIG. 3, if no confidence map is provided for the ground truth depth map, a confidence value for each pixel of the ground truth depth map is estimated using pre-trained confidence estimation model (or confidence estimation network) 30 that takes at least one image of the ground truth depth map, for example, a stereo image and a ground truth depth map corresponding to the stereo image as an input, and by generating the estimated confidence value for each pixel as a confidence map for the corresponding ground truth depth map, the thus generated confidence map and the ground truth depth map 20 may be provided. That is, even if a confidence map for the ground truth depth map is not provided, as shown in FIG. 3, by generating a confidence map using the confidence estimation network 30, the depth information estimation model 10 may be trained by reflecting the generated confidence map.

Figure 5A:
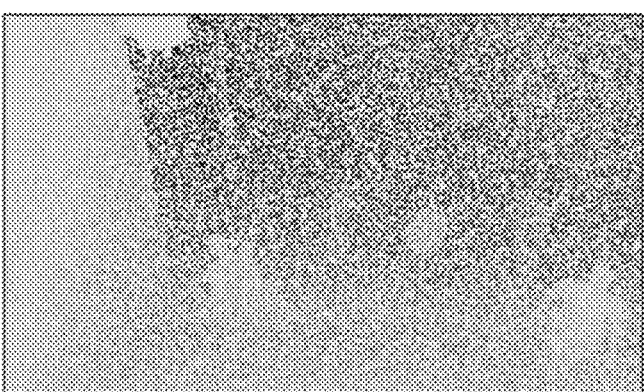
FIG. 5A and FIG. 5B are diagrams illustrating an exemplary diagram for explaining a process of generating a depth map using depth completion technology.
Figure 5B:
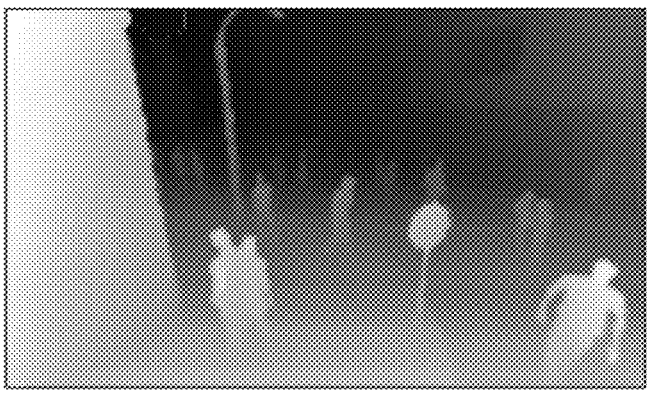

According to another embodiment, step S110, as shown in FIG. 5A, a sparse depth map may be obtained through a device for acquiring a depth map, and as shown in FIG. 5B, when a ground truth depth map is generated using a depth completion technique, a confidence value may be configured to 1 for a depth value generated at the same pixel position as a sparse depth map, and a confidence map for the ground truth depth map of FIG. 5B may be generated by configuring a confidence value based on the distance and the number of pixels having a confidence value of 1 existing within a certain radius with respect to the depth value of the remaining pixel positions. In this case, the confidence value may be configured to a higher value as the number of pixels having a confidence value of 1 increases in a short distance, and the confidence value may be configured to a normalized value between 0 and 1. In addition, step S110, a depth map as shown in FIG. 5B may be generated by the sparse depth map, and when a separate ground truth depth map is provided, a confidence map may be generated based on a difference value between the ground truth depth map provided separately from the depth map of FIG. 5B.

Further, step S110 may include, when only the ground truth depth map is provided, in generating a confidence map for the ground truth depth map, filling in a depth value for a pixel having an empty depth value among pixels of the ground truth depth map using a depth completion technique and providing a confidence map for a ground truth depth map filled with depth values by generating a confidence map for a ground truth depth map filled with empty depth values. In this case, the depth map used to learn the depth information estimation model may be a ground truth depth map filled with empty depth values. In the case of filling empty depth values using the depth completion technique, the process may be performed for all pixels with empty depth values, but is not limited thereto and may be controlled to fill in depth values by a preconfigured ratio. Depending on the embodiment, in step S110, a depth value may be filled using a depth completion technique only for a ground truth depth map in which depth values are empty in pixels of a predetermined ratio or more in the ground truth depth map. In this case, the ratio of empty depth values in the ground truth depth map may be calculated through mask information on the ground truth depth map or the number of pixels with empty depth values compared to the total number of pixels.

Step S120 is a process of learning a depth information estimation model (or depth information estimation network) for estimating depth information. In step S120, in case of providing a confidence map for the ground truth depth map and the ground truth depth map through step S110, the depth information estimation model is learned to estimate depth information using the image, the ground truth depth map and the confidence map for the ground truth depth map.

Figure 2:
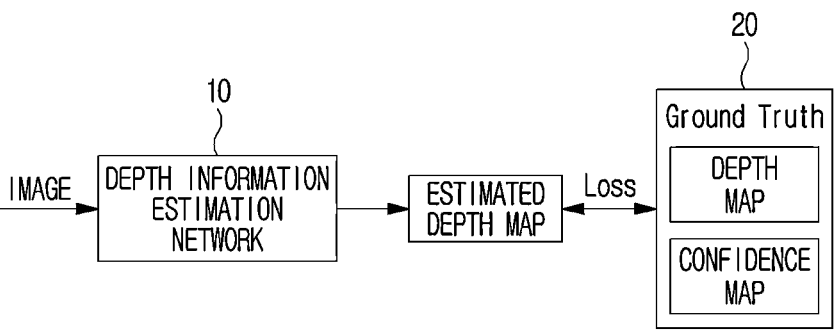
FIG. 2 is a diagram illustrating a learning structure of an embodiment of a depth information estimation network.

For example, in step S120, as shown in FIG. 2, for an image of the ground truth depth map, by reflecting the confidence map for the ground truth depth map in the difference between the depth map and the ground truth depth map estimated by the depth information estimation network 10, the depth information estimation network 10 may be learned. In other words, the step S120 may include a step of learning the depth information estimation network 10 by reflecting both the ground truth depth map and the confidence map 20.

At this time, by reflecting the confidence map of the ground truth depth information in step S120, the depth information estimation model may be learned using a loss function reflecting the confidence map.

Although the existing technology does not use the confidence of the ground truth depth map, in the embodiment of the present disclosure, it is reflected in the loss function used in the depth information estimation model by providing a confidence map for the ground truth depth map. For example, an embodiment of the present disclosure may be used as a weight value of the error value of the depth information estimated by pixels by a confidence value normally normalized by the value between 0 and 1 of the confidence map corresponding to the ground truth depth map. At this time, the loss function used in the embodiment of the present disclosure may be expressed as <Equation 1>below.

$$L = \frac{1}{N}\sum_{j=1}^{H}\sum_{i=1}^{W}w(i,\,j)\{y(i,\,j) - \hat{y}(i,\,j)\}^2 \qquad \text{[Equation 1]}$$

Here, L may mean a loss function. N, h and w may mean the number of pixels in the image, the height and width of the image, and the width. w(I, j), y(I, j), and ŷ(i,j) may mean a confidence value at the pixel position (i, j) in the image, a ground truth depth value, and a depth value predicted by a depth information estimation model, respectively.

When the depth information estimation model is learned through the above-described process, the depth information of the input image to estimate depth information using the learned depth information estimation model may be estimated (S130).

The method according to the embodiment of the present disclosure may be a separate process of learning the depth information estimation model and the process of estimating depth information about the input image using the learned depth information estimation model. In other words, the process of estimating depth information about the input image (S130) may estimate depth information about the input image by using only the depth information estimation model learned by the learning process reflecting the confidence map. The depth information estimation model learned in this way may be applied to all devices, terminals, devices, systems, etc. that may estimate the depth information of the image, so that the device may be used to estimate the depth information about the input image in the device.

Figure 4:
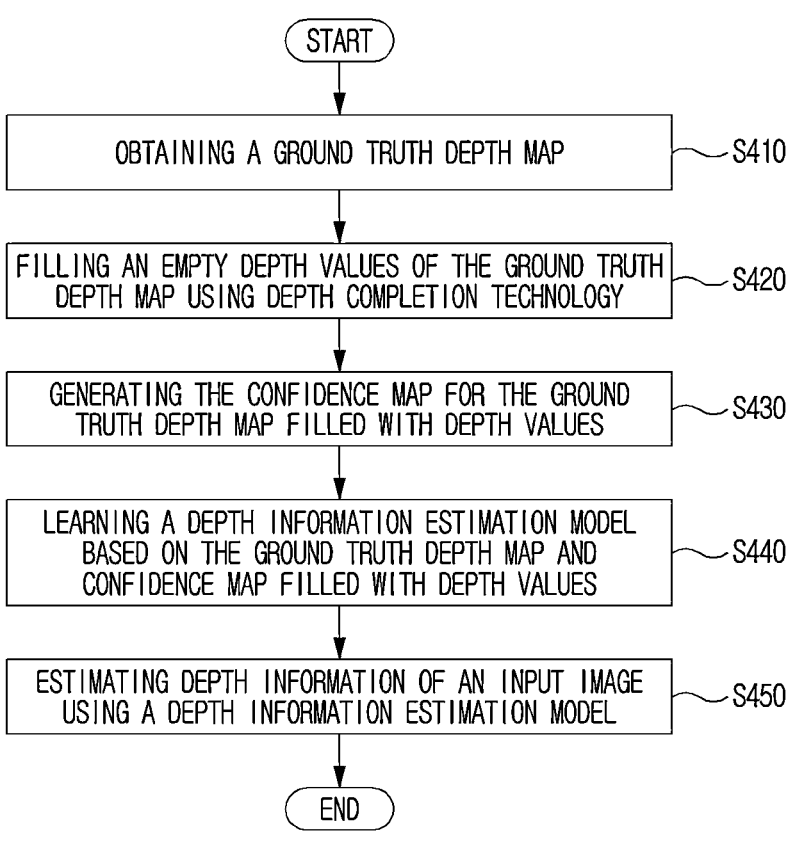
FIG. 4 is a flowchart illustrating a method for estimating depth information of an image according to another embodiment of the present disclosure.

FIG. 4 is a diagram illustrating a flowchart of the depth information estimation method of the image according to another embodiment of the present disclosure.

Referring to FIG. 4, the depth information estimation method of the image according to another embodiment of the present disclosure is obtained a ground truth depth map through the acquisition device(e.g., lidar, etc.), and in this ground truth depth map, depth value is filled using depth completion technology for pixels with empty depth values (S410, S420).

For example, as shown in FIG. 5A in step S420, when a sparse depth map is obtained by LiDAR, as shown in FIG. 5B by using depth completion technology, by filling the depth value of the pixel with empty depth values, the ground-truth information depth map with the depth value may be generated or obtained.

When the depth value of the pixel with empty depth by step S420 is filled, a confidence map for the ground truth depth map filled with depth values is generated (S430).

In one embodiment, in step S430, a confidence map may be generated using a ground truth depth map filled with the ground truth stereo image and depth value. For example, in step S430, the confidence value for each ground truth depth is estimated using a pre-learned confidence estimation model using a ground truth depth map corresponding to the stereo image and the corresponding stereo image, and the estimated pixel confidence value may be generated as a confidence map for the ground truth depth map.

Another embodiment, in step S430, the confidence map may be generated using the ground truth depth map obtained from the step S410, that is, the subsequent information depth map filled with empty depth values by the sparse depth map and step S420. For example, step S430, the confidence value is configured to 1 for the depth values generated in the same pixel position as the sparse depth map in the ground truth depth map with the depth value filled, and by configuring a confidence value based on the number of pixels having a confidence value of 1 in a certain radius for the depth value of the remaining pixel positions, a confidence map for the ground truth depth map filled with depth value may be generated.

When a confidence map is generated by step S430, the depth information estimation model may be learned based on the image of the ground truth depth map, the ground truth depth map filled with depth values and the confidence map for the corresponding depth map (S440).

At this time, the step S430 may learn the depth information estimation model using the loss function of Equation 1. That is, in step S430, the depth information estimation model may be learned using a loss function reflecting the confidence map by reflecting the confidence map for the depth information filled with depth.

When the depth information estimation model is learned through the above-described process, the depth information of the input image to estimate depth information using the depth information estimation model learned is estimated (S450).

As described in FIG. 1, the method of FIG. 4 may also be a process of learning depth information estimation models and the process of estimating depth information about the input image using the learned depth information estimation model.

Like this, the depth information estimation method according to the embodiments of the present disclosure may be used to improve the depth information estimation performance using the depth information estimation network by using the confidence map corresponding to the ground truth depth map when learning depth information estimation network.

Also, in the depth information estimation method according to the embodiments of the present disclosure, the depth map may be generated by generating a confidence map using the difference between the depth map generated by the depth map and the already generated substance information depth map, and the confidence value of the confidence map may be a normalized value of 0 to 1.

MVSNET (Mvsnet: depth inference for unstructured multi-view stereo, Arxiv: 1804.02505v2 [CS.CV] 17 Jul. 2018) is obtained by using the ground truth depth map and the initial depth map to obtain loss function loss0, and the loss function loss1 is obtained by using the ground truth depth map and the refined depth map. The depth information estimation method according to the embodiments of the present disclosure may be used to learn the depth information estimation network using the confidence map in Loss0 and Loss1 when the MVSNET is used as a depth information estimation network. For example, when using L1 loss, by modifying Loss0 and Loss1 to reflect the confidence map in Loss0 and loss0, the value corresponding to the confidence map to the loss function may be applied to the weight, which may improve the performance of the depth information estimation network.

Figure 6:
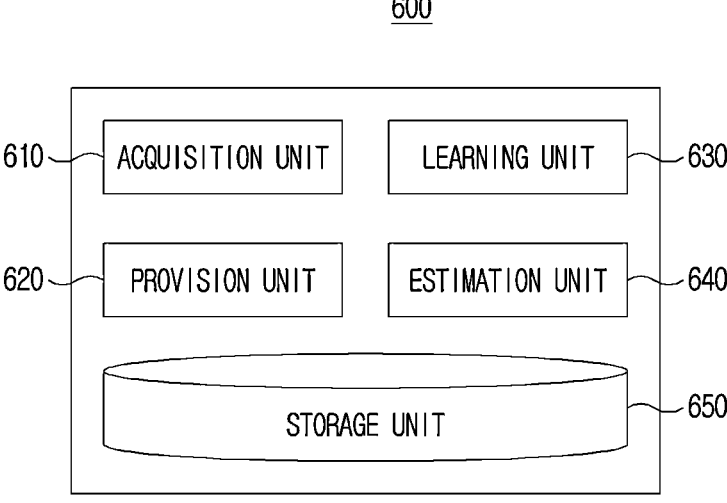
FIG. 6 is a diagram illustrating the configuration of an apparatus for estimating depth information of an image according to another embodiment of the present disclosure.

FIG. 6 is a diagram illustrating a configuration of the depth information estimation apparatus of the image according to another embodiment of the present disclosure. That is, FIG. 6 is a diagram illustrating a configuration for a device for performing a method of FIGS. 1 to 5.

Referring to FIG. 6, the depth information estimation apparatus 600 of the image according to another embodiment of the present disclosure may include the acquisition unit 610, provision unit 620, the learning unit 630, and the estimation unit 640, and the storage unit 650.

The storage unit 650 is a means for storing the data used in the device 600 of the present disclosure. The storage unit 650 may store the image used to learn the depth information estimation network, the ground truth depth map, and the confidence map for the ground truth depth map. The storage unit 650 may include not only the data used to learn the depth information estimation network, but also the verification data for verifying the network and the test data for testing the network.

The acquisition unit 610 may obtain a depth map for learning a depth information estimation network.

At this time, the acquisition unit 610 may obtain a depth map using an acquisition device such as LIDAR.

The provision unit 620 may provide a confidence map for the ground truth depth map and the ground truth depth map used to learn the depth information estimation network.

At this time, the provision unit 620 may generate a confidence map for the ground truth depth map, and may provide the ground truth depth map and the confidence map. For example, the provision unit may provide the ground truth depth map and the confidence map, by generating a confidence map using a pre-learned confidence estimation model that inputs at least one image corresponding to the ground truth depth map and the ground truth depth map.

Furthermore, the provision unit 620 may also provide a ground truth depth map filed with a depth value and the confidence map, by filling the empty depth value of the depth map obtained by the acquisition unit 610 with depth completion technology and generating a confidence map for the ground truth depth map filled with empty depth values. In this case, the provision unit 620 may fill in an empty depth value of a ground truth depth map having an empty depth value equal to or greater than a predetermined ratio among the ground truth depth maps by using a depth completion technique.

The learning unit 630 may learn a depth information estimation model, for example, a depth information estimation network, based on the image of the ground truth depth map, the ground truth depth map filled with depth values and the confidence map for the corresponding depth map.

At this time, the learning unit 630 may learn a depth information estimation network using the loss function of Equation 1.

The estimation unit 640 may estimate depth information on the input image to estimate depth information using the depth information estimation network learned by the learning unit 630.

Although the description is omitted in the device of FIG. 6, the apparatus according to the embodiment of the present disclosure may include all the contents described in the method of FIGS. 1 to 5, which is obvious for those who are engaged in the technical field.

Figure 7:
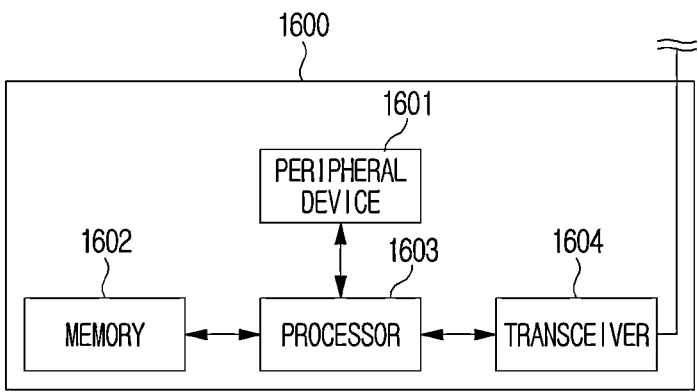
FIG. 7 is a block diagram of a device to which an apparatus for estimating depth information of an image according to another embodiment of the present disclosure is applied.

FIG. 7 is a diagram illustrating a configuration of a device in which the depth information estimator of the image is applied according to another embodiment of the present disclosure.

For example, the depth information estimation apparatus of the image according to another embodiment of the present disclosure of FIG. 6 may be the device 1600 of FIG. 7. Referring to FIG. 7, the device 1600 may include a memory 1602, a processor 1603, a transmission bride 1604, and a peripheral device 1601. In addition, as an example, the device 1600 may further include another configuration and is not limited to the above-described embodiments. In this case, the device 1600 may be, for example, a movable user terminal (e.g., a smartphone, a laptop, a wearable device, etc.) or a fixed management device (e.g., server, PC, etc.).

More specifically, the device 1600 of FIG. 7 may be an exemplary hardware/software architecture such as the depth information learning device of the image and the depth information estimation terminal of the image. At this time, for example, the memory 1602 may be non-mobile and mobile memory. In addition, as an example, the peripheral device 1601 may include a display, GPS or other peripherals, and is not limited to the above-described embodiments.

In addition, as an example, the device 1600 described above may include communication circuits as shown in the transmission bride 1604, and may perform communication with external devices based on it.

Also, for example, the processor 1603 may be at least one or more of one or more microprocessor associated with universal processors, DSP (Digital Signal Processor), DSP core, controller, micro controllers, ASICs (Application Special Circuits), FPGA (Field Programmable Gate Array) circuits, any other types of ICs (Integrated circuits) and state machines. In other words, it may be a hardware/software configuration that acts as a control role for controlling the above-described device 1600. In addition, the processor 1603 may be performed by modifying the functions of the formation 620, the learning unit 630 and the estimated unit 640 of FIG. 6 described above.

At this time, the processor 1603 may run the computer-executable commands stored in the memory 1602 to perform various essential functions of the depth information estimation device of the image. As an example, the processor 1603 may control at least one of signal coding, data processing, power control, input and output processing and communication operation. In addition, the processor 1603 may control the physical layer, the Mac layer, and the application layer. In addition, as an example, the processor 1603 may perform authentication and security procedures in the access layer and/or application layer, and is not limited to the above-described embodiments.

For example, the processor 1603 may communicate with other devices through the transceiver 1604. As an example, the processor 1603 may control the depth information estimator of the image through the network through the network to control the communication with other devices through the execution of computer executable commands. That is, communications performed in the present disclosure may be controlled. For example, the transceiver 1604 may transmit an RF signal through the antenna and transmit signals based on various network networks.

For example, MIMO technology, beamforming, etc. may be applied as an antenna technology, and are not limited to the above-described embodiments. In addition, the signal transmitted and receiving through the transceiver 1604 may be modulated and demodulated and controlled by the processor 1603, and is not limited to the above-described embodiments.

Exemplary methods of this disclosure are represented by the series of movements for clarity of explanation. However, this is not intended to limit the order in which the step is performed, and if necessary, each step may be performed simultaneously or in different order. In order to implement the method according to the present disclosure, additional steps may be included in the exemplary step, the remaining steps except for some steps, or additional steps except for some steps.

The various embodiments of the present disclosure are to explain the typical patterns of the present disclosure, not all possible combinations, and the details described in various embodiments may be applied independently or may be applied in two or more combinations.

In addition, various embodiments of the present disclosure may be implemented by hardware, firmware, software, or combination of them. In the case of implementation by hardware, it may be implemented by one or more ASICs (Application Special Circuits), DSPs (Digital Signal Processors), DSPDs (Digital Signal Processing Devices), PLDs (Programmable Logic Devices), FPGAs (Field Programmable Gate Arrays), General Processor, Controller, Microcontroller, Micro Processor, and the like.

The scope of the present disclosure includes software or machine-executable commands (e.g., operating system, application, firmware, program, etc.) that make operations from the device or computer to run on a computer, and such software or commands, such as non-transitory computer-readable medium executable on the device or computer.

What is claimed is:

1. A method of estimating the depth information of an image, the method comprising:
   providing, by an apparatus including a memory and a processor, a confidence map for a ground truth depth map; and
   learning, by the apparatus, a depth information estimation model that estimates depth information of an image based on the ground truth depth map and the confidence map,
   wherein the providing the confidence map includes:
      filling, by the apparatus, an empty depth value of the ground truth depth map using a depth completion technique and providing the confidence map by generating the confidence map for the ground truth depth map filled with the empty depth value,
   wherein the generating the confidence map includes:
      configuring, by the apparatus, a confidence value to 1 for a depth value generated in a same pixel position as the ground truth depth map; and
      generating, by the apparatus, the confidence map for the ground truth depth map filled with the empty depth value, by configuring the confidence value based on a distance from a number of pixels having a confidence value present in a certain radius for a depth value of a remaining pixel position.

2. The method of claim 1,
   wherein the providing the confidence map includes:
   generating, by the apparatus, the confidence map using a pre-learned confidence estimation model that inputs at least one image corresponding to the ground truth depth map and the ground truth depth map.

3. The method of claim 1,
   wherein the providing the confidence map includes:

for a ground truth depth map with a predetermined ratio of the empty depth value among the ground truth depth map, filling, by the apparatus, the empty depth value using the depth completion technique.

4. The method of claim 1, wherein the learning the depth information estimation model includes:

learning, by the apparatus, the depth information estimation model by reflecting the confidence map in a loss function.

5. A method for estimating depth information of image, the method comprising:

obtaining, by an apparatus including a memory and a processor, a ground truth depth map;

filling, by the apparatus, an empty depth value for each of the obtained ground truth depth map using a depth completion technique;

generating, by the apparatus, a confidence map for the ground truth depth map filled with the empty depth value; and learning, by the apparatus, a depth information estimation model for estimating depth information of an image based on the ground truth depth map filled with the empty depth value and the confidence map, wherein the providing the confidence map includes:

configuring, by the apparatus, a confidence value to 1 for a depth value generated in a same pixel position as the ground truth depth map; and generating, by the apparatus, the confidence map for the ground truth depth map filled with the empty depth value, by configuring a confidence value based on a distance from a number of pixels having a confidence value present in a certain radius for a depth value of a remaining pixel position.

6. The method of claim 5, wherein the generating the confidence map includes:

generating the confidence map based on the ground truth depth map filled with the empty depth value and at least one image corresponding to the obtained ground truth depth map.

7. The method of claim 6, wherein:

the filling using the depth completion technique includes:

for a ground truth depth map with a predetermined ratio of the empty depth value among the ground truth depth map, filling, by the apparatus, the empty depth value using the depth completion technique.

8. An apparatus for estimating depth information of an image, the apparatus comprising:

a memory;

a transceiver; and a processor, wherein the processor is configured to:

provide a confidence map for a ground truth depth map;

learn a depth information estimation model for estimating depth information of an image based on the ground truth depth map and the confidence map; and fill an empty depth value of the ground truth depth map using depth completion technology and provide the confidence map by generating the confidence map for the ground truth depth map filled with the empty depth value, wherein the processor is configured to:

configure a confidence value to 1 for a depth value generated in a same pixel position as the ground truth depth map; and generate the confidence map for the ground truth depth map filled with the empty depth value, by configuring the confidence value based on a distance from a number of pixels having the confidence value present in a certain radius for a depth value of a remaining pixel position.

9. The apparatus of claim 8, wherein the processor is configured to:

generate the confidence map using a pre-learned confidence estimation model that inputs at least one image corresponding to the ground truth depth map and the ground truth depth map.

10. The apparatus of claim 8, wherein the processor is configured to:

for a ground truth depth map with a predetermined ratio of the empty depth value among the ground truth depth map, fill the empty depth value using the depth completion technology.

11. The apparatus of claim 8, wherein the processor is configured to:

learn the depth information estimation model by reflecting the confidence map in a loss function.

* * * * *